INVENTOR
HAROLD W. PRICE
BY
ATTORNEY

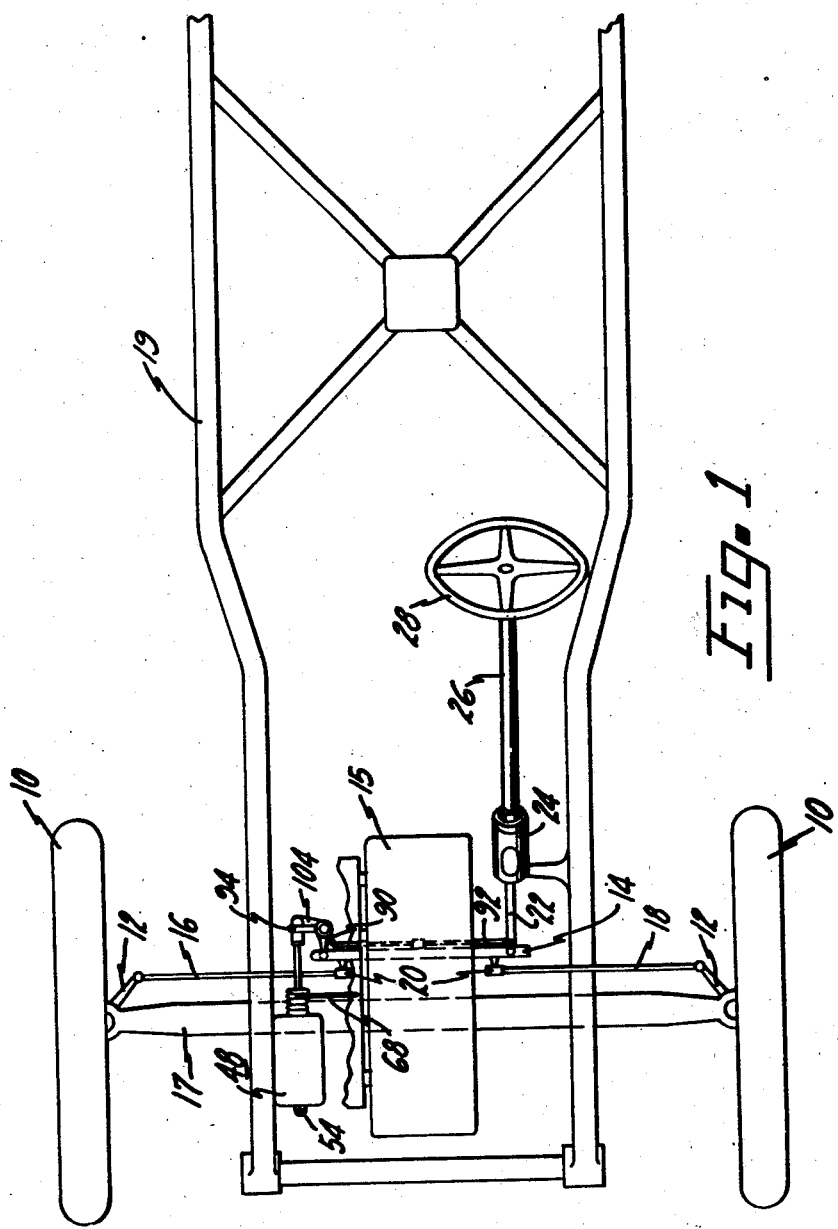

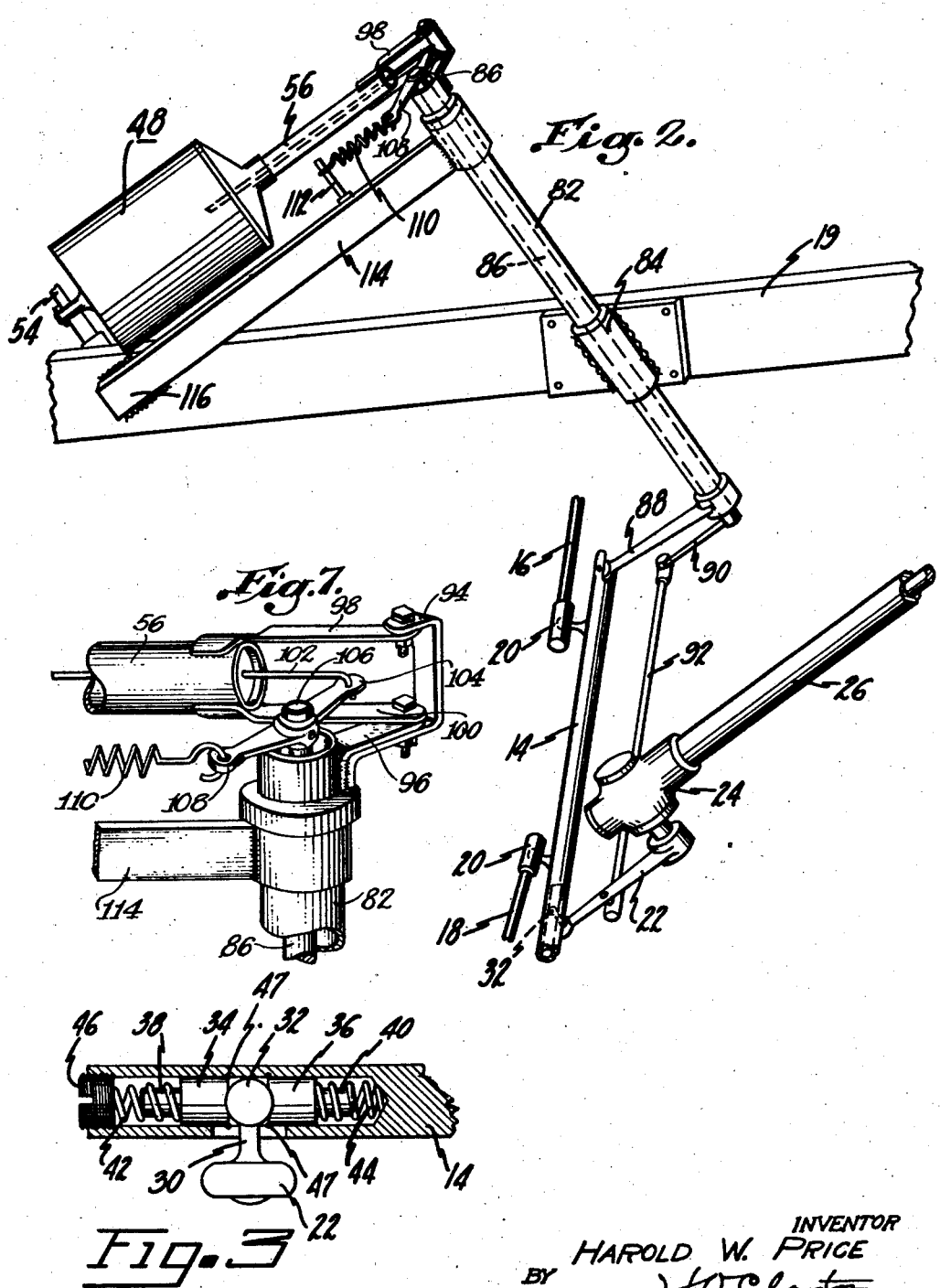

Patented Aug. 24, 1948

2,447,815

UNITED STATES PATENT OFFICE 2,447,815

FLUID PRESSURE CONTROLLED POWER STEERING MECHANISM

Harold W. Price, South Bend, Ind., assignor to Bendix Aviation Corporation, South Bend, Ind., a corporation of Delaware Application June 22, 1944, Serial No. 541,484

5 Claims. (Cl. 180—79.2)

1

The present invention relates to steering mechanism and more particularly to a novel and improved fluid pressure operated steering mechanism particularly adapted for use with automotive vehicles.

The present invention has for its object the provision of an improved power operated steering mechanism particularly adapted for use with automobiles.

Another object of the invention is to provide a power operated steering mechanism which may be actuated by suction derived from the intake manifold of the internal combustion engine. Still another object of the invention is to provide an improved steering mechanism which is easy to operate and safe in operation. Yet another object of my invention is to provide a combined manually and power operated steering mechanism for automotive vehicles in which manually operated steering means are rendered operative when the force necessary to move the front wheels is comparatively low said means being also automatically operative to effect the manual operation of the steering wheels upon failure of the aforementioned power steering means.

In accordance with a preferred embodiment of my invention there is provided a manually and power operated steering mechanism which is in many respects similar to conventional steering mechanism and is provided with a steering wheel geared to a pitman arm which in turn is connected through a tie rod mechanism to the steering knuckles to which the steering wheels are secured. A fluid pressure and preferably suction operated piston is connected to the tie rod mechanism to move said mechanism in either direction and this piston is movable within its cylinder under control of a valve so that the piston movement in either direction is exactly proportional to the movement of the control valve. This control valve, known in the art as a follow up valve, is connected to the gear driving the pitman arm and is also connected with spring means tending to return the valve to a normal position that is a position to effect a neutral setting of the aforementioned piston. In this position of the piston the steering wheels are in their straight ahead position.

Yet another object of my invention is to provide yieldable means in the connection between the pitman arm and the tie rod mechanism of the steering mechanism of an automotive vehicle whereby there is provided means, operable when a predetermined resistance to movement of the steering wheel is encountered, to effect an opening of the aforementioned valve to thereby effect an energization of the aforementioned motor.

It is apparent therefore that it is an object of my invention to provide a steering mechanism for an automotive vehicle wherein the steering of the vehicle is facilitated and imposes no strain on the operator even when the vehicle is moving very slowly as when parking. The gear ratio between said steering wheel and the steering knuckles may be reduced thereby reducing the amount of turning of the steering wheel necessary for a sharp turn and at the same time increasing the maneuverability of the vehicle in traffic. The aforementioned fluid pressure operated cylinder acts to stabilize the steering mechanism at high vehicle speeds on rough roads so that the effort of such driving is reduced and safety is increased and for the same reason the effect of a blow out of a tire is minimized. Tire wear may be reduced and the importance of the camber tow in and caster angles is reduced. Failure of any part of the power operating mechanism cannot have serious effects as the manual steering mechanism is always available and is automatically rendered operative. The steering mechanism is self centering and no effort on the part of the driver is necessary to keep the vehicle traveling in a straight path and if the steering wheel is released the wheels are automatically moved to straight ahead position.

Other objects and advantages of the invention will be readily apparent to those skilled in the art from the following description taken in connection with the accompanying drawings which represents a preferred embodiment. After considering this embodiment skilled persons will understand that many variations may be made without departing from the principles disclosed; and I contemplate the employment of any structures, arrangements or modes of operation that are properly within the scope of the appended claims.

Figure 1 is a plan view of a portion of the power plant of an automotive vehicle having incorporated therein the steering mechanism constituting my invention;

Figure 2 is a view disclosing in perspective the principal elements of the steering mechanism constituting my invention;

Figure 3 is a longitudinal sectional view disclosing details of the yieldable connection between the pitman arm and tie rod mechanism of my invention;

Figure 7 is an enlarged view of one of the principal parts of the valve operating linkage disclosed in Figure 2.

Figure 4:
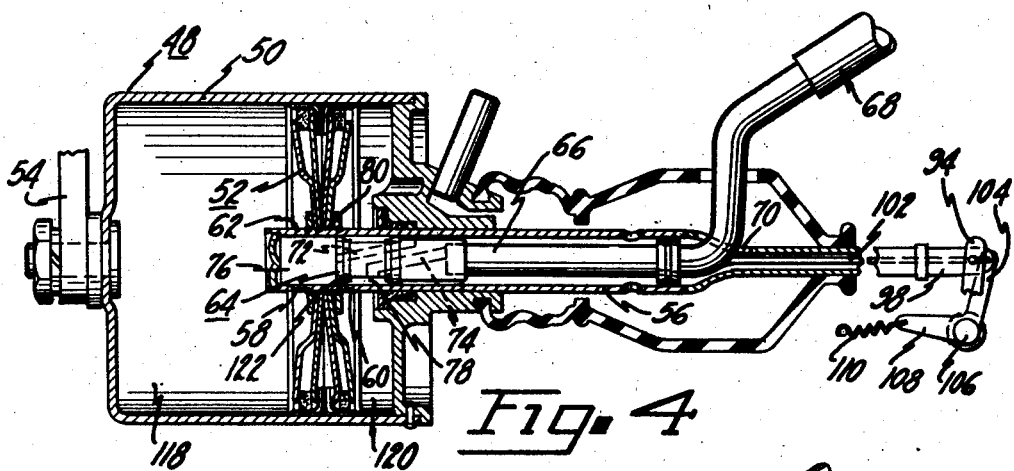
Figures 4, 5 and 6 are sectional views of the pressure differential operated motor of the power steering mechanism of my invention each view disclosing a different operative position of the piston.

Referring now to Figures 1 and 2 disclosing a preferred embodiment of my invention there is disclosed in Figure 1 the usual front wheels 10 which are mounted on their individual steering knuckles 12 so that they may be swung about their kingpins while remaining substantially parallel to concentric circles and thus serve to steer the vehicle. The steering knuckles are preferably interconnected by means of a tie rod mechanism including a rod 14 and rods 16 and 18 the latter being preferably connected to the rod 14 by ball and socket connections 20 of conventional design. The rods 16 and 18 are of course, each pivotally connected to one of the steering knuckles. There is also diagrammatically disclosed in Figure 1 the internal combustion engine 15, the front axle 17 and a portion of the frame of the vehicle indicated by the reference numeral 19.

My invention lies in the power and manually operated means for operating a tie rod mechanism which mechanism is preferably though not necessarily constructed of the aforementioned three rods.

Describing now this tie rod operating means constituting my invention a pitman arm 22 is angularly movable by a reduction gearing 24 of conventional design said gearing being operable by the mechanism within the usual steering column 26 which mechanism is rotated by a steering wheel 28. The essence of my invention lies in the means for effecting a power and/or manual operation of the tie rod mechanism said means including a certain yieldable connection between one end of the pitman arm and the tie rod mechanism. This tie rod operating mechanism, as will appear from the description to follow, provides a means for operating the tie rod either by a physical effort of the driver coupled with a force exerted by the power means or solely by the physical effort of the driver.

The aforementioned yieldable connection between the pitman arm and tie rod mechanism is disclosed in detail in Figure 3 and includes an arm 30 extending from one end of the pitman arm 22 a ball shaped end member 32 of said arm fitting within a recessed end of the tie rod 14. Thrust members 34 and 36, preferably cylindrical in shape, are provided with opposed recessed faces within which fits the ball member 32. The members 34 and 36 are provided respectively with stems 38 and 40 and sleeve over said stems are compression springs 42 and 44. The spring 42 at one of its ends abuts the outer end face of the member 34 and at its other end abuts the inner face of a nut 46 threadedly mounted in one end of the tie rod 14. The spring 44 at one of its ends abuts the bottom of the recess in the tie rod and at its other end abuts the outer end face of the thrust member 36. Split rings 47 serve to limit the movement of the thrust members 34 and 36 to the right and left respectively, Figure 3.

Referring now to an important feature of my invention the parts of the above described yieldable connection are so constructed and arranged that the springs 42 and 44 are each compressed that is preloaded, to say 125 pounds. The purpose of this preloading of said springs will be described hereinafter.

Describing now the power means for operating the tie rod mechanism a pressure differential operated motor 48, including a cylinder 50 and a piston 52, is detachably secured to a support member 54 which is secured to the frame 19 of the vehicle. A tubular connecting rod 56 is fixedly connected at one of its ends to the power element that is piston 52 said rod being provided with valve ports 58 and 60 located adjacent the hub portion of said piston. The end portion 62 of the rod 56 therefore becomes a valve member and said member cooperates with a spool shaped valve member 64 secured to one end of a tube 66. To one end of this tube there is connected a conduit 68 connected to the intake manifold of the internal combustion engine 15 or any other suitable source of vacuum. Relative movement of the tube 66 and rod 56 is made possible by virtue of a slot 70 in the rod 56. The valve member 64 is provided with ducts 72 and 74 the duct 72 serving to connect a compartment 76 within the rod 56 with the interior of said rod to the right of said valve member. The duct 74 serves to connect the interior of the tube 66 with a recess 78 in the valve member 64.

Describing the force transmitting means interconnecting the valve members 62 and 64, the piston 52, the pitman arm 22 and the tie rod mechanism a hub portion 80 of the piston 52 serves to interconnect the piston and the valve member 62. Referring to Figure 2 a hollow rod or post 82 is rotatably mounted in a bearing 84 which is fixedly secured to the chassis frame 19; and there is telescoped within the post 82 a rotatable rod 86. Crank arms 88 and 90 extend respectively from the lower ends of the rods 82 and 86 said arms being pivotally connected respectively to the tie rod mechanism 14 and to a link 92 which is pivotally connected to the pitman arm 22. To the upper end of the rod 82 there are secured spaced apart flanges or what might better be termed fingers 94 and 96 to which are pivotally secured spaced apart flanges 98 and 100 which are secured to the outer end of the tube 56. The latter flanges straddle the outer end of a rod 102 which is permanently secured to the tube 66; and to the outer end of the rod 102 there is pivotally connected an arm 104 secured to the upper end 106 of the rod 86. An arm member 108 is also secured to the upper end of the rod 86 the two arms together constituting a bell crank lever.

One feature of my invention lies in the provision of a spring 110 secured at its ends to the arm 108 and a post 112 the latter member extending from a support 114. The end portion 115 of this support 114 constitutes a bearing for the rotatable post 82 and the other end of said support is fixedly secured at 116 to the frame 19. As will be described in greater detail hereinafter the spring 110 serves to bias the valve member 64 to the position disclosed in Figure 5, that is the position to effect an operation of the motor 48 to move the steering wheels to their straight ahead position.

Describing now the operation of the above described steering mechanism constituting my invention it will be assumed that the engine is idling thereby creating in its manifold a source of vacuum sufficient to effect an energization of the motor 48. It will also be assumed that the steering wheels 10 are in their straight ahead position. The parts of the mechanism are so constructed and arranged that in this straight ahead position the parts of the valve 62, 64 and the piston 52 are in the position disclosed in Figure 5. Now it will be noted from an inspection of Figure 5 that with this relative position of the valve parts 62, 64 both ends of the motor, indicated as compartments 118 and 120, are vented to the atmosphere.

Assuming now for the purpose of illustration that the vehicle is parked so that the left front wheel is along the curb and to the right thereof, the driver will, in order to move the car away from the curb turn the steering wheel 28 to the right that is clockwise. This operation will, if the resistance to movement of the pitman arm exceeds the aforementioned 125 pounds, result in a counterclockwise movement of the pitman arm 22 and a further compression of the spring 42. There is thus effected a relative movement of the pitman arm and tie rod 14 and a relative movement of the crank arms 88 and 90; and this operation results in a movement to the left, Figures 4, 5 and 6, of the valve member 64. The valve parts 62 and 64 then assume the relative positions disclosed in Figure 6 whereby the compartment 118 is connected to the source of vacuum that is the manifold, and the compartment 120 is maintained vented to the atmosphere. The piston 52 is thus subjected to a differential of pressures to move the same to the left to the position disclosed in Figure 6; and this operation of course constitutes a so-called power operation or power loading of the tie rod mechanism the crank arm 88 being rotated counterclockwise. If the driver should, in the operation being described, arrest the movement of the steering wheel as the front wheels are being turned to the right then the valves 62, 64 will effect a follow up to lap operation to maintain a certain power loading of the piston 52. Describing this operation after the valve is opened, the valve parts assuming the relative positions disclosed in Figure 6, then if the movement of the valve part 64 is arrested the movement of the valve member 62 will continue until the port 58 is covered by a land portion 122 of the valve member 64. The connection between the compartment 118 and the source of vacuum is thus cut off thereby arresting the movement of the piston 52 the system being then in equilibrium. This operation of the power mechanism is known as a follow up operation there being thus provided means for effecting successive movements of the steering wheels as a result of successive movements of the steering wheel.

The operation of effecting a turning movement of the front wheels to the left will not be described inasmuch as this operation will be apparent from the above description of the operation of the mechanism in effecting a movement of the wheel to the right. Suffice it to say that when the steering wheel 28 is turned to the left then if the resistance to movement of the wheels is greater than, say, 125 pounds the spring 44 of Figure 3 will be further compressed and the relative movement of the valve parts to the relative positions disclosed in Figure 4 will result; and this will result in an energization of the motor 48 the piston 52 moving to the position disclosed in Figure 2.

Now it is to be particularly noted that with the mechanism constituting my invention the motor 48 is not energized that is not brought into play, unless the force necessary to move the steering wheel exceeds a predetermined factor, say, 125 pounds. This resistance to movement of the wheels is usually encountered if the car is parked or is being driven in muddy ground. For normal driving, say on the usual macadam or cement highway, very little effort is required to rotate the steering wheel. It follows therefore that with normal driving the steering mechanism of my invention will be operated solely by the physical effort of the driver for there will not be any compression of the springs 42 and 44 to result in an energization of the motor 48. If however the resistance to movement of the steering wheels exceeds the pre-loading of the springs 42 and 44 then the force developed to move said wheels is the sum of the force exerted by the piston 52 and the physical effort of the driver. It is also to be noted that in the event of failure of the power means the wheels may be moved to steer the vehicle solely by the physical effort of the driver.

Figure 5:
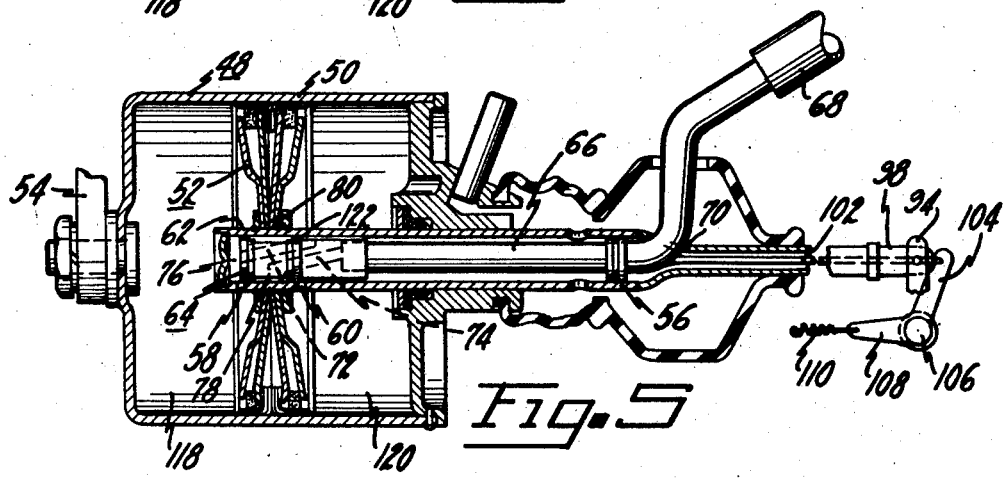
Figure 6:
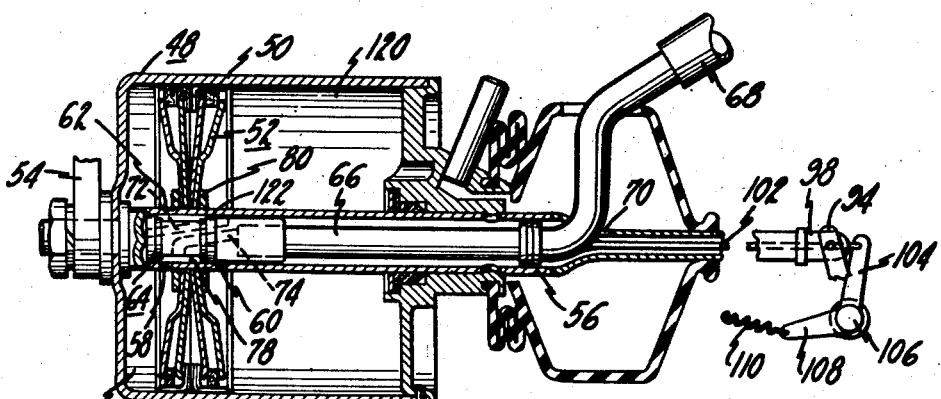

Referring to the function of the spring 110 as noted above the same serves to bias the valve member 64 to the position disclosed in Figure 5. It will therefore now be apparent that if the driver should remove his hands from the steering wheel at a time when the motor 48 is energized that the spring 110, functioning as a return spring, will reverse the direction of movement of the valve member 64 and steering wheel; and this operation will result in a power operation of the mechanism to return the steering wheels to their straight ahead position. Incidentally this operation supplements the operation of the so-called wheel caster in maintaining the straight ahead position of the steering wheels.

I claim:

1. In an automotive vehicle provided with a chassis frame structure two wheels by which the vehicle is steered and further provided with a source of suction, means for moving the wheels for steering either manually or by suction or both said means including a steering wheel, a reduction gearing operable by the steering wheel, a pitman arm operable by the reduction gearing, a tie rod mechanism including three interconnected rods one of said rods being connected with one end of the pitman arm by a yieldable means, a pressure differential operated motor for actuating the tie rod mechanism to effect a steering movement of the steering wheels said motor being mounted alongside the aforementioned frame structure, follow-up valve means, including two relatively movable members one of which is operatively connected to the power element of the motor, for controlling the operation of said motor and force transmitting linkage interconnecting the valve means, the pitman arm and the tie rod mechanism said force transmitting linkage including two rotatable rod members mounted upon the aforementioned frame structure one of said members being telescoped within the other member, said force transmitting linkage further including means interconnecting the lower end of one of the rod members with the tie rod mechanism and the lower end of the other rod member with the pitman arm.

2. In an automotive vehicle provided with two wheels by which the vehicle is steered and further provided with a source of suction, means for moving the wheels for steering either manually or by suction or both, said means including a steering wheel, a reduction gearing operable by the steering wheel, a pitman arm operable by the reduction gearing, a tie rod mechanism including three interconnected rods one of said rods being connected with one end of the pitman arm by a yieldable means including two separate springs of a certain strength, a pressure differential operated motor for actuating the tie rod mechanism to effect a steering movement of the steering wheels, follow-up valve means, including two relatively movable members, for controlling the operation of said motor, said valve means being housed within the motor, and force transmitting linkage interconnecting the valve means, the power element of the motor, the pitman arm and the tie rod mechanism said force transmitting means including two rod members telescoped one within the other, means interconnecting the upper ends of said rod members with the aforementioned two valve members, a crank interconnecting the lower end of one of said rod members with one of the rods of the tie rod mechanism, a crank connected to the lower end of the other of said rod members, and a link member interconnecting the latter crank and the pitman arm, said link paralleling the tie rod mechanism.

3. In an automotive vehicle provided with a source of suction and with wheels by which the vehicle is steered, means for moving the wheels for steering either manually or by suction or both said means including a steering wheel, a steering knuckle connected to each of the aforementioned wheels, a pitman arm, a three-part tie rod mechanism interconnecting the steering knuckles, yieldable means interconnecting one end of the pitman arm with one end of one of the parts of the tie rod mechanism and power means for actuating the tie rod mechanism to effect a steering movement of said wheels said power means including a pressure differential operated motor comprising a cylinder and a power element, valve means, including two relatively movable parts, for controlling the operation of the motor and housed within said motor, and force transmitting means, including means interconnecting one of the valve parts with the other end of the aforementioned tie rod part, interconnecting the relatively movable parts of the valve, the power element of the motor, the pitman arm and the aforementioned one part of the tie rod mechanism, the parts of the aforementioned mechanism being so constructed and arranged and so operative that with the initial movement of the steering wheel there results, by virtue of the compression of the aforementioned yieldable means, an operation of the valve to effect the energization of the motor to thereby effect movement of the tie rod mechanism to move the wheels, said operation being effected when and only when the force necessary to move the wheels exceeds a certain factor.

4. In an automotive vehicle provided with a source of suction and with wheels by which the vehicle is steered, means for moving the wheels for steering either manually or by suction or both, said means including a steering wheel, a steering knuckle connected to each of the aforementioned wheels, a pitman arm, a tie rod mechanism interconnecting the steering knuckles, yieldable means interconnecting one end of the pitman arm and the tie rod mechanism and power means for actuating the tie rod mechanism to effect a steering movement of said wheels said power means including a pressure differential operating motor comprising a cylinder and a power element, valve means, including two relatively movable parts, for controlling the operation of the motor and housed within said motor and force transmitting means, including two rods one telescoped within the other, a crank mounted on the end of one of said rods, a crank mounted on the end of the other rod and a link interconnecting said last mentioned crank and the pitman arm, thereby interconnecting the relatively movable parts of the valve, the power element of the motor, the pitman arm and the tie rod mechanism, the parts of the aforementioned mechanism being so constructed and arranged and so operative that with the initial movement of the steering wheel there results, by virtue of the compression of the aforementioned yieldable means, an operation of the valve to effect the energization of the motor to thereby effect movement of the tie rod mechanism to move the wheels, said operation being effected when and only when the force necessary to move the wheels exceeds a certain factor.

5. In an automotive vehicle provided with a source of suction and with wheels by which the vehicle is steered, means for moving the wheels for steering either manually or by suction or both said means including a steering wheel, a steering knuckle connected to each of the aforementioned wheels, a pitman arm, a three-part tie rod mechanism interconnecting the steering knuckles, yieldable means interconnecting one end of the pitman arm with a portion of the tie rod mechanism and power means for actuating the latter mechanism to effect a steering movement of said wheels said power means including a pressure differential operated motor comprising a cylinder and a power element, follow-up valve means, including two relatively movable parts, for controlling the operation of said motor, and force transmitting means, including a link operably connected to one part of the valve means and directly connected to the pitman arm intermediate its ends, and further including a crank member connected to a portion of the tie rod mechanism and operably connected to the other part of said two-part valve means, said force transmitting means serving to interconnect the two relatively movable parts of the valve means, the power element of the motor, the pitman arm and the tie rod mechanism.

HAROLD W. PRICE.

REFERENCES CITED

The following references are of record in the file of this patent:

UNITED STATES PATENTS

| Number | Name | Date |
|---|---|---|
| 1,749,816 | Hendrix | Mar. 11, 1930 |
| 1,869,698 | Komfala | Aug. 2, 1932 |
| 1,875,226 | Dewandre | Aug. 30, 1932 |
| 2,051,816 | Bragg | Aug. 25, 1936 |
| 2,152,506 | Thorne | Mar. 28, 1939 |
| 2,294,331 | Douglas et al. | Aug. 25, 1942 |
| 2,341,502 | Ingres | Feb. 8, 1944 |
| 2,368,741 | Bowling | Feb. 6, 1945 |

FOREIGN PATENTS

| Number | Country | Date |
|---|---|---|
| 295,307 | Great Britain | Aug. 7, 1928 |